(12) United States Patent
Hackwell et al.

(10) Patent No.: US 11,907,504 B2
(45) Date of Patent: Feb. 20, 2024

(54) NAVIGATING BUILDING PLANS

(71) Applicant: Progressive Plans, Inc., Midway, UT (US)

(72) Inventors: Samuel Hackwell, Midway, UT (US); Andrew Perkins, Richmond, IN (US)

(73) Assignee: Progressive Plans, Inc., Midway, UT (US)

( * ) Notice: Subject to any disclaimer, the term of this patent is extended or adjusted under 35 U.S.C. 154(b) by 0 days.

(21) Appl. No.: 17/869,565

(22) Filed: Jul. 20, 2022

(65) Prior Publication Data
US 2023/0025398 A1    Jan. 26, 2023

Related U.S. Application Data

(60) Provisional application No. 63/223,958, filed on Jul. 20, 2021.

(51) Int. Cl.
| | |
|---|---|
| G06F 3/0483 | (2013.01) |
| G06F 40/134 | (2020.01) |
| G06F 40/166 | (2020.01) |
| G06Q 50/08 | (2012.01) |
| G06F 40/103 | (2020.01) |
| G06F 40/194 | (2020.01) |
| G06F 40/197 | (2020.01) |
| G06F 16/44 | (2019.01) |

(52) U.S. Cl.
CPC .......... *G06F 3/0483* (2013.01); *G06F 40/103* (2020.01); *G06F 40/134* (2020.01); *G06F 40/166* (2020.01); *G06F 40/194* (2020.01); *G06F 40/197* (2020.01); *G06Q 50/08* (2013.01); *G06F 16/444* (2019.01)

(58) Field of Classification Search
CPC .... G06F 16/444; G06F 3/0483; G06F 40/134; G06F 40/194; G06F 40/103; G06F 40/166; G06F 40/197; G06Q 50/08
See application file for complete search history.

(56) References Cited

U.S. PATENT DOCUMENTS

| | | | |
|---|---|---|---|
| 8,010,906 B1 * | 8/2011 | Sinnard | G06T 17/05 |
| | | | 95/212 |
| 2007/0255725 A1 * | 11/2007 | McCoach | G06F 16/444 |
| 2009/0216438 A1 * | 8/2009 | Shafer | G01C 21/206 |
| | | | 701/414 |

(Continued)

*Primary Examiner* — Daniel Samwel
(74) *Attorney, Agent, or Firm* — Sam IP Legal Solutions, P.C.; Ryan D. Sam

(57) ABSTRACT

Embodiments of the present disclosure relate generally to modifying and navigating building plans. In particular, one or more embodiments relate to a system that improves the ease and efficiency in which a user, through a client device, may view and use building plans comprised of a plurality of content items. The system may receive a plurality of content items associated with a building plan, combine sets of two or more content items representing a substructure, form locational links between the plurality of content items, and provide a navigational interface for display on a client device associated with a user through which the client device may navigate through the plurality of content items of the building plan. Further, alternate content items may be received and overlayed on corresponding content items. Any differences between the corresponding content items may be highlighted.

20 Claims, 13 Drawing Sheets

(56) References Cited

U.S. PATENT DOCUMENTS

| | | | | |
|---|---|---|---|---|
| 2010/0171826 A1* | 7/2010 | Hamilton | ............... | H04N 7/188 348/135 |
| 2016/0012160 A1* | 1/2016 | Mohacsi | ................. | G06T 13/80 703/1 |
| 2019/0156120 A1* | 5/2019 | Lorenzo | .............. | G06F 3/04815 |

* cited by examiner

NAVIGATING BUILDING PLANS

RELATED APPLICATIONS

This application claims priority to U.S. Provisional Application Ser. No. 63/223,958, filed Jul. 20, 2021.

BACKGROUND OF THE INVENTION

Builders have been using building plans for hundreds of years to assist them in the construction of houses, buildings, and other structures. With the advancement of technology and building methods over the years, building plans have become quite complex documents containing many sheets, notes, cross-references, etc. For example, a typical building plan may contain a cover sheet, a site plan sheet, elevational sheets, floor plan sheets, cross-section sheets, detail sheets, structural sheets, foundation sheets, electrical and mechanical sheets, etc.

Traditionally, and still today, building plans are printed out on large sheets of architectural paper. A skilled builder takes these plans to a construction site and uses the numerous sheets of the building plan for guidance in the construction of the planned structure. In recent years, building plans and the associated sheets have been converted from paper to electronic form. This allows a builder to take a tablet or other device to a construction site and to have all of the building plan sheets available in electronic form on their device. Whether using traditional printed plans or the more modern electronic form, it can still be difficult and tedious for new and experienced builders alike to effectively and efficiently use the many sheets of a building plan to construct a planned structure. To complicate the matter further, changes to the building plan are often requested.

To illustrate this, a builder, while viewing the first-floor plans may want to see the associated electrical sheets. So, the builder will have to sift through the building plans to find the electrical sheets for viewing. Similarly, the builder may want to see the mechanical sheets associated with the first-floor and will have to go back to sift through the building plans to find and view the mechanical sheets. This same thing will happen for the builder to view details associated with the first floor, cross-sections, etc. On top of this, the builder will have to keep track of changes to the building plan and make sure those plans are followed rather than old plans. Thus, using building plan sheets can be tedious for beginning builder and more experienced builders alike.

Accordingly, there has been an ongoing need for improvements and advancements in building plans to better assist building professionals in their work. Therefore, improvements and advancements in building plans that better assist builders in constructing new structures would be well received.

SUMMARY OF THE INVENTION

One or more embodiments disclosed herein provide benefits and/or solve one or more of the foregoing or other problems in the art with systems and methods of navigating electronic building plans. In particular, one or more embodiments reduce the time it takes to find what a user is looking for within a building plan, reduce the learning curve necessary for users to learn how to effectively read and use building plans, allow users to easily see changes made to the building plan, etc. For example, one or more embodiments provide systems and methods for receiving a building plan comprised of a plurality of content items containing information related to the construction of a structure. The content items may be sheets or files of a building plan, or portions of sheets or files of a building plan, containing information about the structure to be built. The structure may be a residential home, commercial building, or other structure to be built. The applications of the various embodiments may extend past homes and buildings to any other item, machinery, landscape, etc. where a plan may be used. After receiving the building plan, the one or more embodiments providing systems and methods may process the building plans and providing a navigational interface for display on a client device associated with a user such that a user may easily and efficiently navigate through the building plans without having to shift through numerous sheets.

Further, various embodiments disclosed herein provide systems and methods for identifying sets of two or more of the plurality of content items of the building plan that contain information related to a substructure of the structure represented by the building plan in its entirety and then combining these sets of two or more content items into one content item containing all of the information related to the substructure of the set. This has the effect of reducing the number of content items contained in the original building plan. The substructures may represent, for example, a first floor that was broken up into two or more sheets or files, an exterior wall that was broken up into two or more sheets or files, a roof that was broken up into two or more files, etc. This may be accomplished by analyzing the content items for similarities and matching the content items where lines or other markings may logically meet. Additionally or alternatively, a prompt may be provided to a client device as to which contents items may be combined and a user may then choose whether or not to combine the two or more content items. Additionally or alternatively, a user may provide indication through a client device as to which content items may be combined.

Further, various embodiments disclosed herein provide systems and methods for forming locational links between the plurality of content items. Locational links may be formed within a single content item or may be formed from a first content item to a second content item. Generally, the locational links are formed between a first point and a second point that have some relationship such as being adjacent to each other or being directly above or below each other on different floors. By way of example, a locational link may be formed between a first point located in the kitchen of the first floor of a residential structure as represented in a first content item and a second point located in the adjacent family room of the first floor of a residential structure as represented in the first content item. Additionally or alternatively, a locational link may be formed between a first point located in the kitchen of the first floor of a residential structure as represented in a first content item and a second point located in an office which is directly above the kitchen on the second floor as represented in a second content item. A single point may be linked to any other point that is adjacent or directly above or below the single point. In this manner, locational links may be formed between and within the plurality of content items of the building plan. The locational links may allow a client device associated with a user to navigate through the plurality of sheets associated with a building plan in a simple and straightforward manner. Additionally or alternatively, a prompt may be provided to a client device as to which locational links should be formed and a user may then choose whether or not to form the locational links. Additionally or alternatively, a user may provide indication through a client device as to which locational links should be formed.

In addition, various embodiments disclosed herein provide systems and methods for linking details with their associated content items. For example, a first content item may have areas that indicate that more details may be found on a second content item. The various methods and systems herein provided may identify a content item containing one or more details associated with other content items, separate the details from the content item into their own detail items, and link the detail items with their associated content items. Additionally or alternatively, detail items that are related to each other may be linked in sets such that the set of related detail items are all linked to their associated content item. Additionally or alternatively, a prompt may be provided to a client device as to which details may be linked to which content items and a user may then choose whether or not to form the links. Additionally or alternatively, a user may provide indication through a client device as to which details should be linked to which content items.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

A more particular description of the disclosure along with related advantages and features will be rendered by reference to specific embodiments thereof that are illustrated in the appending drawings. These drawings only depict typical embodiments of the present disclosure and are not to be considered to be limiting of its scope. Various embodiments of the disclosure will be described and explained with additional specificity and detail through the use of the accompanying drawings, in which.

DETAILED DESCRIPTION OF THE PREFERRED EMBODIMENTS

Figure 1:
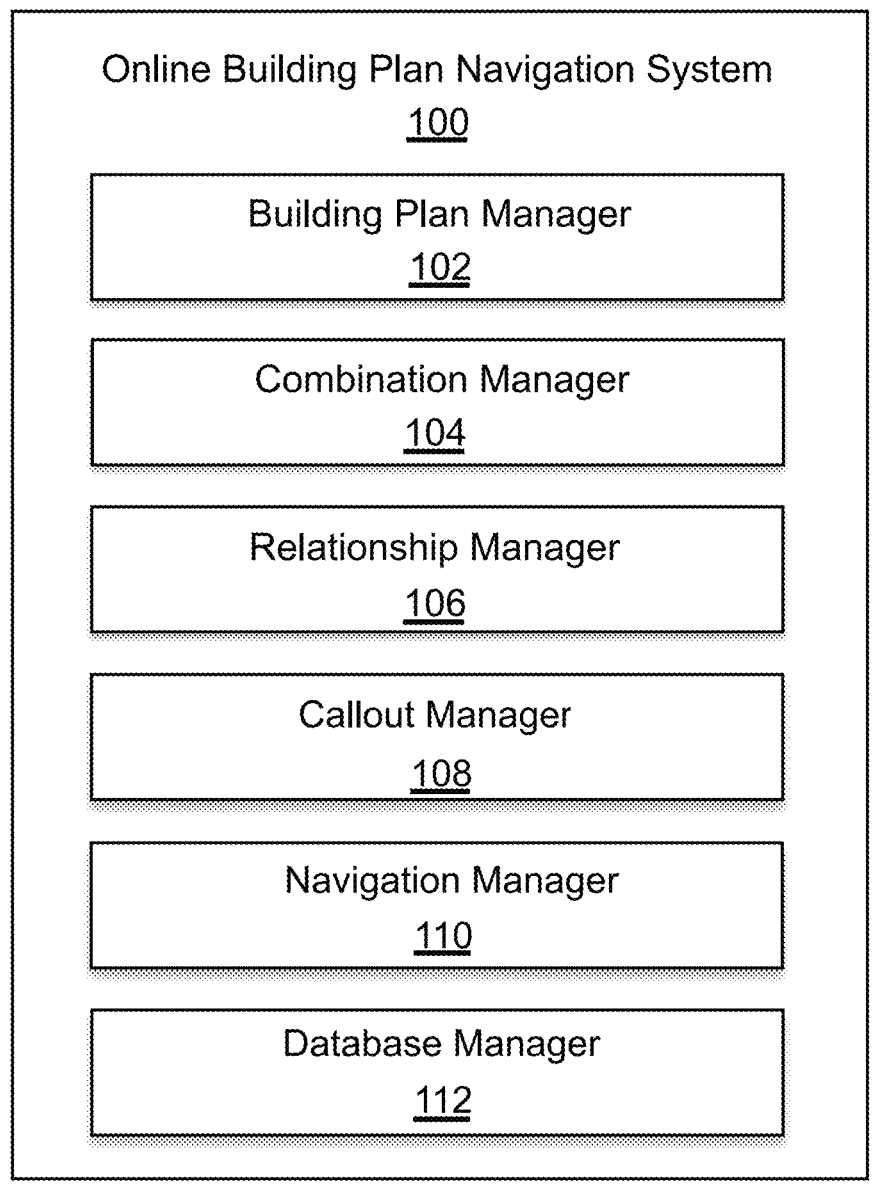
FIG. 1 illustrates a schematic diagram of a system for navigating building plans in accordance with one or more embodiments described herein.

As shown in the drawings and for purposes of illustration, the one or more embodiments disclosed herein facilitate the effective navigation of a plurality of content items associated with a building plan and thereby improve the efficiency and ease in which a user can view and use building plans. As described above, a building plan may be comprised of a plurality of content items. The plurality of content items may be physical sheets, electronic files, or parts of electronic files making up a building plan. The building plan as a whole may include a plurality of content items which, taken together, contain the information to construct or build a given structure. The content items, individually or as sets or two or more content items, may include information related to the construction of a substructure which is part of the structure as a whole. The content items may include cover sheets, site plan sheets, elevational sheets, floor plan sheets, cross-section sheets, detail sheets, structural sheets, foundation sheets, electrical and mechanical sheets, or any other content item associated with a building plan.

In general, one or more embodiments of the system improve a user's experience of accessing and navigating a building plan by using a system that is non-native to a client device associated with a user. For example, a system can receive a plurality of content items making up a building plan for a given structure and may generate views of the building plan and portions thereof that are easily navigable by the client device associated with a user. The system may further provide the client device associated with a user with access to a plurality of content items associated with a building plan and may further allow the client device associated with a user to view, open, edit, or otherwise interact with the plurality of sheets or files. The system may further apply the client device's edits to the plurality of content items to further improve the navigability of the building plans. The system may also edit and modify the content items of the building plans without input from the client device according to the methods and processes described in more detail below.

As used herein, an "edit" may refer to any information associated with a modification, addition, deletion, or other change applicable to any content item of a building plan. More particularly and as more fully described below, an "edit" may refer to combination assignments and relationship assignments through the placement of reference indicia, which may include reference points, markers, alignments, grids, lines, or some other graphic or indicia, which may be recognizable by the system, applied by the client device or the system to the plurality of content items of a building plan.

As used herein, a "building plan" may refer to a collection of a plurality of content items which may include pdf sheets, construction documents, drawings, plans of various formats, or of any piece, part or section of the foregoing, which together form the building plan of a single structure. "Building plan" may also refer to a plurality of content items comprised of sections of a single electronic file or a plurality of electronic files that together form the building plan of a single structure. One skilled in the art would recognize that the disclosure could also be implemented in a number of other fields outside of construction of residential and commercial structures, and could be implemented in connection with mechanical drawings for machinery or other mechanical products, electronic schematics, industrial design drawings, etc. As used herein, "building plan" may also refer to technical and informational drawings as used in other fields outside of construction of residential and commercial structures. The plural "building plans" may refer to the plural of any of the definitions above.

With reference now to FIG. 1, an example embodiment of a building plan navigation system 100 (the "system") in accordance with one or more principles described herein is illustrated. As shown, the system 100 may include building plan manager 102, combination manager 104, relationship manager 106, callout manager 108, navigation manager 110, and database manager 112. Each of the components of system 100 may be in communication with one another using any suitable communication technologies. It will be recognized that although components 102-112 are shown to be separate in FIG. 1, any of components 102-112 may be combined into fewer components, such as into a single component, or divided into more components as may serve a particular embodiment. In addition, components 102-112 may be implemented by or located on one or more computing devices, such computing devices being described below in connection with FIG. 6. In the alternative, portions of system 100 may be implemented on a client device or multiple client devices with other portions of system 100 being implemented on the online building plan navigation system 100 as described below.

The components 102-112 may comprise software, hardware or a combination thereof. For example, components 102-112 may comprise one or more instructions stored on a computer-readable storage medium and executable by one or more processors of one or more computing devices. When executed by the one or more processors, the computer executable instructions of system 100 may cause a computing device to perform the methods described herein. Alternatively, components 102-112 may comprise hardware, such as a special purpose processing device to perform a certain function or group of functions. Additionally or alternatively, components 102-112 may comprise a combination of computer-executable instructions and hardware.

As already described above, system 100 may include a building plan manager 102. Building plan manager 102 may receive, provide, manage, and/or control access to one or more building plans that are associated with a given user and/or a given client device. More specifically, building plan manager 102 may receive building plans from a client device and maintain and control access to the received building plans. For example, building plan manager 102 may receive building plans from client device associated with a user through an upload over a network. Alternatively, building plan manager 102 may receive building plans from two or more client devices associated with two or more users. The building plan manager 102 may receive a plurality of content items associated with a given building plan in .pdf format, .dwg, .dxf, or any other format commonly known in the art and as commonly used for architectural and building plans. Furthermore, building plan manager 102 may maintain the received building plans in association with a given user or client device such that the building plans do not have to be maintained on the client device. In the alternative, client device may also maintain a local copy in addition to uploading the building plans to the system. Additionally, or in the alternative, building plan manager 102 may receive and maintain a plurality of content items, as described above, associated with a building plan from one or more users and/or client devices.

Building plan manager 102 may also provide access to the plurality of content items of a building plan to one or more client devices for viewing, sharing, editing, or for some other reason. Building plan manager 102 may further restrict and/or limit access to the plurality of content items of a building plan depending on permissions, identification of the client device, or some other criteria. For example, building plan manager 102 may require a username and password to access the plurality of content items associated with a given building plan. Depending on the identification of the client device, building plan manager 102 may provide unlimited access to view, share and edit each of the plurality of content items associated with a given building plan. Additionally, depending on the identification of the client device, building plan manager 102 may limit the client device to viewing, sharing, and/or editing only select content items of the plurality of content items of the building plan. Moreover, depending on the identification of the client device, building plan manager 102 may limit the client device to only viewing some or all of the plurality of sheets content items associated with a building plan.

Additionally, building plan manager 102 may limit a client device as to what edits the client device may make to the building plans based on the identity of the client device. For example, building plan manager may limit a client device to only making combination assignments and relationship assignments as described more fully below. For other client devices, building plan manager 102 may limit edits to size, resolution, dimensions, or other similar features of the building plans.

Building plan manager 102 may further maintain files of multiple building plans each containing a plurality of content items associated with one or more client devices. Building plan manager 102 may control access to the files of multiple building plans based on the identity of the client device. For example, building plan manager may provide access, similar to what was described above, to one or more client devices, depending on identification, to multiple files of building plans.

As described above, system 100 may include combination manager 104 having access to one or more of a plurality of content items of one or more building plans. Generally, combination manager 104 may recognize and combine one or more related content items of a building plan. For example, in traditional printed building plan sheets and also in .pdf format of these traditional sheets, some floor plans or other views may be too large to fit on a single sheet. These large floor plans and other views are commonly broken up onto two or more sheets such that the details of the floor plans or other views are clear enough to see by the user. When receiving content items building plans made up of .pdf files as described above, the system 100 may have two or more content items associated with a given building plan that all contain information related to the same substructure, such as a floor plan or other view. Combination manager 104 may identify and combine these two or more content items such that the substructure represented by the said two or more content items is not broken up into two or more pieces, but is one solid substructure. Additionally, a building plan may have a large sheet showing multiple rooms of a floor. Because the sheet is large, traditional plans may leave out some details. For example, a room may have less details on the large sheet showing multiple rooms, but a more detailed version of that same room may be provided in another place in the traditional plans. Combination manager 104 may also cut out the less detailed room and replace it with the more detailed version of the room such that all the details are shown on the larger sheet.

More specifically, building plan manager 102 may receive a building plan having combination assignments placed on two or more of the plurality of content items associated with the building plan before the plurality of content items of the building plan were received by system 100. Combination manager 104 may have access to the plurality of content items of the building plan and recognize the combination assignments and combine the two or more content items, or portions of two or more content items, based on the combination assignments. Additionally, or in the alternative, combination manager 104 may provide a client device access to the plurality of content items of the building plan for editing by the client device such that the client device may place combination assignments onto two or more of the plurality of content items of a building plan. The combination manager 104 may also provide suggestions to the client device of content items, or portions of content items that may be combined and may provide combination assignments that the client device may choose to accept or reject. After providing access to the client device for editing, combination manager 104 may combine two or more content items of the building plan according to the combination assignments. Furthermore, and in the alternative, the combination manager 104 may automatically make combination assignments that may be reviewed by a client device.

System 100 may further include relationship manager 106 having access to one or more of a plurality of content items of one or more building plans. Generally, relationship manager 106 may recognize and link locations of the structure represented by the building plans on different content items, such as on different floors, that are similarly positioned areas relative to the structure as a whole. For example, a building plan representing a house may have a floorplan representing a basement level with a northwest corner, a main floor level with a northwest corner directly above the basement northwest corner, and an upstairs level with a northwest corner directly above the main floor northwest corner. The relationship manager 106 may recognize these related points and form links between them. For example, the relationship manager 106 may form a link between the northwest corner of the basement and the northwest corner of the main floor and another link between the northwest corner of the main floor and the northwest corner of the upstairs. Likewise, other related locations on different floors or on multiple floors may also be linked by the relationship manager 106 in similar fashion.

Additionally, relationship manager 106 may recognize and link locations of the structure represented by the building plans on the same content item, such as on the same floor, that are related in position relative to the structure as a whole, such as being adjacent areas. For example, a building plan representing a house may have a floorplan representing the first floor having a kitchen and a family room that are adjacent to each other. The relationship manager 106 may recognize these related points as being adjacent to each other and form links between them. For example, the relationship manager 106 may form a link between the kitchen and the family room of the first floor. Likewise, other adjacent locations on the same content item may also be linked by the relationship manager 106 in similar fashion.

More specifically, building plan manager 102 may receive a building plan having reference indicia and associated relationship assignments placed on one or more of the plurality of content items associated with the building plan before the plurality of content items of the building plan were received by system 100. Relationship manager 106 may have access to the plurality of content items of the building plan and recognize the reference indicia and relationship assignments and link the reference indicia on the one or more content items according to the relationship assignments. In the alternative, relationship manager 106 may provide a client device access to the plurality of content items of the building plan for editing by the client device such that the client device may place reference indicia and make associated relationship assignments in connection with one or more of the plurality of content items of a building plan. The relationship manager 106 may alternatively provide suggestions to a client device of places where reference indicia may be placed that the client device may choose to accept or reject. After providing access to the client device for editing, relationship manager 106 may link the reference indicia on the one or more content items according to the relationship assignments. In the alternative, relationship manager 106 may automatically make relationship assignments and link the relationship assignments. The assignments and links made by the relationship manager may be reviewed by a client device and may be kept, deleted, or modified.

In addition, building plan manager 102 may receive one or more alternate versions of a building plan wherein one or more content items of an alternate building plan may have one or more alterations from an original building plan that building plan manager 102 has already received. Similar to what has been described above, the alternate building plan may also have reference indicia and associated relationship assignments before the building plan manager 102 received them or as later applied by a client device. The relationship manager 106 may have access to the alternate building plan. Furthermore, the relationship manager 106 may provide a client device access to the alternate building plan such that the client device may compare one or more of the content items of the alternate building plan with one or more corresponding content items of the original building plan by using the reference indicia to align and overlay the corresponding content items. Once the corresponding content items are aligned and overlayed, any differences or abnormalities may be highlighted or marked. Alternatively, relationship manager 106 may automatically compare the corresponding content items of the alternate building plan with the original building plan through use of the reference indicia and highlight or otherwise mark any differences or abnormalities.

System 100 may further include callout manager 108 having access to one or more of a plurality of content items of one or more building plans. Generally, callout manager 108 may recognize and link details and/or cross-sections associated with callouts on the building plans with each other and with relationship assignments as described above. For example, traditional building plans have a plurality of callouts on floorplans and other sheets which indicates to the reader to go to a details sheet or cross-section sheet to view what the call out is making reference to. The detail sheets or cross-section sheets generally have a number of details or cross-sections on a single sheet. Callout manager 108 may frame the individual details and cross-sections of a content item and associate them with their given callouts on different content items. More specifically, the callout manager 108 may have access to one or more of a plurality of content items of a given building plan, recognize the content items containing details and cross-sections and form frames around each detail and cross-section such that they are separated into their own detail items, match each individual detail item with its associated callout on a different content item, and link related detail items to each other. Additionally, the callout manager 108 may link a group of related detail items to the nearest reference indicia.

More specifically, a content item containing a room on a floor plan may have five callouts, one for the north wall, one for the east wall, one for the south wall, one for the west wall and one for the ceiling. Once the callout manager 108 has matched and linked each framed detail item with its associated callout, the callout manager 108 may link related detail items. For example, the callout manager 108 may link the detail item of the north wall with the detail item of the east wall and the detail item of the ceiling, the detail item of the east wall with the detail item of the south wall and the detail item of the ceiling, the detail item of the south wall with the detail item of the west wall and the detail item of the ceiling and the detail item of the west wall with the detail item of the north wall and the detail item of the ceiling. Furthermore, the callout manager 108 may link each of the detail items for the north wall, the east wall, the south wall, the west wall, and the ceiling to the reference indicia of that room on the floorplan.

Additionally, or in the alternative, the callout manager 108 may provide a client device access to the plurality of content items of the building plan for editing by the client device such that the client device may add relationship assignments between specific details and a given reference indicia. Callout manager 108 may provide the client device with suggestions as to where relationship assignments between specific details and given reference indicia may be placed that may be accepted or rejected by the client device. After providing access to the client device for editing, callout manager 108 may apply the relationship assignments made by the client device by linking two or more details with each other and with a given reference indicia according to the relationship assignments and in a manner as described above.

As mentioned above, system 100 may also include navigation manger 110 having access to one or more of a plurality of content items of one or more building plans. Generally, navigation manager 110 provides one or more client devices with access to the building plans and allows the client device to view and navigate the building plans. For example, the navigation manager 110 may recognize each of the links made by the relationship manager 106 and the callout manager 108 and link a navigational tool to one of the reference points applied by the relationship manager 106. The navigation manager 110 may navigate through the reference points through the links created by the relationship manager 106. For example, the navigation manager 110 may navigate right, left, forward and backward to reference points located on the same floor of the building plan. Furthermore, the navigation manager 110 may navigate up and down to reference points on different floors of the building plan according to the links created by the relationship manager 106.

Moreover, the navigation manager 110 may navigate through the details and the cross-sections linked by the callout manager 108. Specifically, when on a reference indicia, such as a reference point, that is linked to callouts, such as details and/or cross-sections, the navigation manager 110, may navigate to those linked details and/or cross-sections. For example, when on a reference indicia for a room that is linked to details of the four walls, which are linked to each other and the ceiling as described above, navigation manager 110 may navigate to any of the linked wall details and from the wall details to the other wall details or the ceiling detail. Navigation manager 110 may navigate in like manner for any other details and cross-sections linked to a reference indicia and to each other as described above.

Navigation manager 110 may further provide an indication of direction. For example, the navigation manager 110 may provide a compass that indicates the direction being faced. For example, when navigating North and when facing North walls, the navigation manager may indicate the direction of North. When navigating East or facing East walls, the navigation manager 110 may indicate East. The navigation manager 110 may similarly indicate West, South, Northwest, Northeast, Southwest, Southeast, etc.

Additionally, navigation manager 110 may also set a viewing frame that is centered around the reference point to which the navigation manager 110 has linked the navigational tools. The navigation manager 110 may also provide a client device with zooming options that may be selected by a client device. The navigation manager 110 may zoom in or zoom out according to the selection by the client device such that the view of the building plan within the viewing fame is either enlarged or reduced in size accordingly. The navigation manager 110 may also indicate the scale of the portion of the building plan within the viewing frame.

Furthermore, the navigation manager 110 may also track the viewing history of a client device and allow the client device to retrace its history by going to previous viewed frames and back forward along the tracked history. For example, client device may view the main floor, navigate to the roof plan, and zoom in to a chimney section of the roof. The navigation manager 110 may allow the client device to then retrace its history by going back from the zoomed in chimney section to the full roof plan, and then go back to the main floor plan using the history function.

System 100 may further include database manager 112 which may manage the storage of building plans on one or more databases which are accessible to system 100. Additionally, database manager 112 may control access to building plans which are stored on the one or more databases. For example, database manager 112 may store a building plan or a copy of the building plan which was received by the system 100 onto one or more databases. Furthermore, database manager 112 may store building plans with edits applied by a client device such as the combination assignments and relationship assignments in the one or more databases. After storage onto the one or more databases, database manager 112 may also control access to building plans and associated edits which are stored in the one or more databases.

Figure 2:
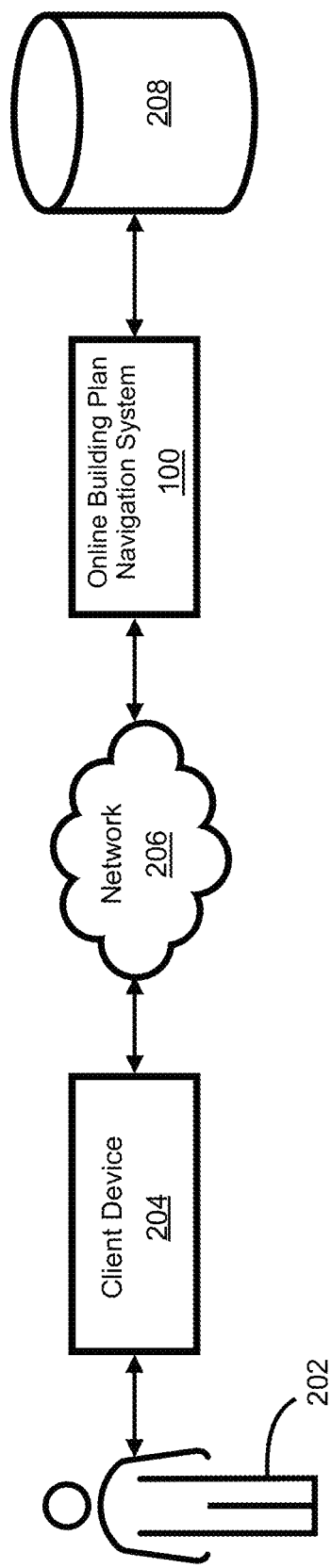
FIG. 2 illustrates a block diagram of an environment for implementing the system of FIG. 1 in accordance with one or more embodiments described herein.

FIG. 2 illustrates an example environment 200 for implementation of building plan navigation system 100. As depicted in the figure, the example environment may include a user 202, a client device 204 which may be associated with the user 202, a network 206, the building plan navigation system 100 which may be in communication with the client device 204, and a database 208. At the outset, it is important to note that in some embodiments, the functions and features described herein may be performed entirely on system 100 alone. However, in the alternative, client device 204 may also perform one or more of the functions and features described with respect to system 100. Some or all of the functions and features described herein, in some embodiments, may be performed by both the system 100 and client device 204. It is also important to note that alternative embodiments may also include additional client devices associated with additional users as more fully descried below.

In some embodiments, the client device 204 may obtain or access building plan content items. For example, the client device 204 may obtain building plan content items through upload or may create building plan content items which may then be stored on the client device 204. In the alternative, the client device 204 may receive building plan content items from the system 100. For example, the system 100 may provide access to building plan content items to the client device 204.

The client device 204 may additionally provide access to building plan content items to user 202 through a graphical user interface. The client device 204 may receive edits to the building plan content items from the user 202. For example, the user 202 may make combination assignments, add reference indicia, make relationship assignments, or other edits to a given set of building plan content items through the graphical user interface of the client device 204. Furthermore, the client device 204, after receiving the various edits from a user, may provide the edits to the system 100 over the network 206.

In some embodiments, the system 100 may receive building plan content items from the client device 204. Additionally, the system 100 may receive edits from the client device 204 which were received by client device 204 from user 202. The system 100 may modify and organize the building plans or content items according to the edits. Additionally, the system 100 may apply navigational tools to the building plan content items.

In some embodiments, the system 100 may receive and analyze the building plan content items and modify and organize the building plans or content items according to the system's 100 analysis. For example, the system 100 may analyze the building plan content items for callouts indicating specific details, cross-sections, etc. The system 100 may then frame individual details or cross-sections into their own detail items and link them with the callouts of content items of the building plan. The system 100 may then link related detail items to each other. Furthermore, the system 100 may then link the related detail items to the nearest applied reference indicia.

The system 100 may further provide access to the modified and navigable building plan or plans to the client device 204. The client device 204 may in turn provide access to the modified building plans to the user 204, through a graphical user interface, for viewing or further editing.

In some embodiments, the system 100 may also store the modified or unmodified building plans on the database 208. When system 100 receives edits from client device 204 as described above, the system 100 may apply those edits by modifying and/or organizing building plan content items stored in the database 208. The database 208 may provide storage of building plans which may be accessed by the system 100. Furthermore, in some embodiments, the building plans stored on the database 208 may be made accessible to client device 204. The database 208 may be comprised of one or more databases or storage which are assessable by the system 100 and/or the client device 204. Additionally, one or more of the databases 208 or storage may be separate from system 100 or may be part of system 100.

Figure 3:
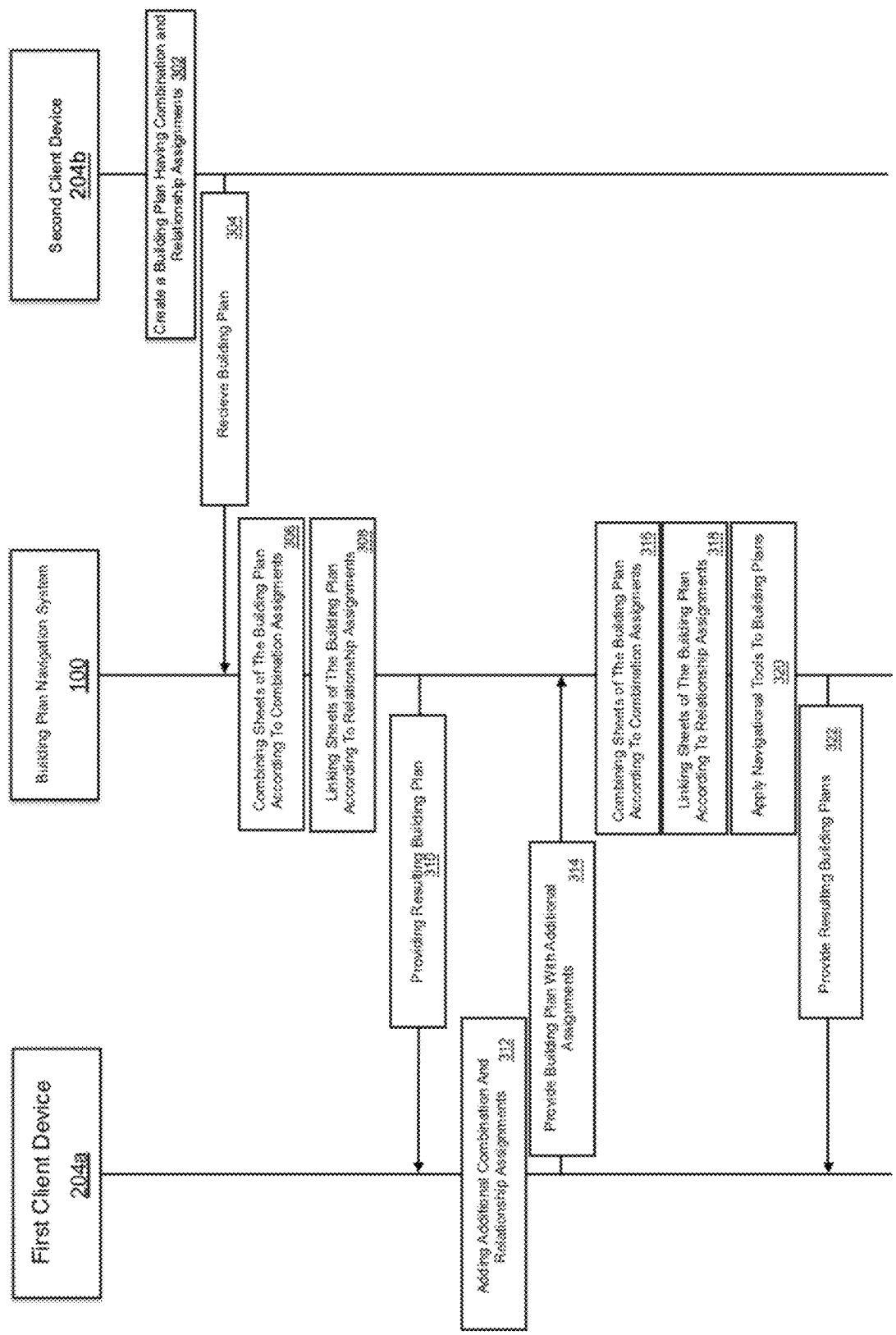
FIG. 3 illustrates a method-flow diagram showing the building plan navigation system interacting with a first client device and a second client device to provide navigable building plans in accordance with one or more embodiments described herein.

FIG. 3 illustrates a diagram showing an example method flow of building plan navigation system 100 interacting with first client device 204a and with second client device 204b to provide navigable building plans to a user in accordance with one or more embodiments. The building plan navigation system 100, first client device 204a and second client device 204b may be example embodiments of corresponding components as described in connection with FIG. 2. As mentioned above, the system 100 is not limited to interacting with one or two client devices but may interact with a plurality of client devices 204. For example, system 100 may interact with a client device associated with a builder, a client device associated with an architect, a client device associated with an engineer, a client device associated with a surveyor, a client device associated with an owner, etc. For example, the building of a structure may require collaboration from one or more of a builder, an architect, an engineer, a surveyor, an owner, etc. in which case, system 100 may interact with a plurality of client devices associated with each user. For purposes of illustration and for the following description below, first client device 204a may be associated with a builder and second client device 204b may be associated with an architect. Alternatively, second client device 204b may be associated with an engineer, surveyor, etc. and still follow the same steps outlined below. Again, as mentioned above, client devices may preferrable be tablet devices, but may also be desktop computers, laptops, smart phones, or any other device known in the art capable of interacting with system 100.

As shown in step 302, second client device 204b may create a plurality of content items associated with one or more building plans that may have combination assignments and relationship assignments. For example, the architect, engineer, surveyor, etc. in association with second client device 204b may create content items such or a building plan such as sheets or files and place combination assignments on one or more content items that represent the same floor plan. Additionally, relationship assignments may be created between similarly situated points on different content items such as different floors of the floor plan. Alternatively, second client device 204b may simply create content items such as building plan sheets or files without placing any relationship or combination assignments on the building plans. Similarly, a third client device, fourth client device, etc. may also create content items such as building plan sheets or files with or without combination and relationship assignments.

In step 304, the building plan navigation system 100 may receive building plans containing a plurality of content items from a second client device 204b. This may be accomplished by the second client device 204b uploading the building plans to the system 100 through a LAN line or through a wireless network such as WIFI, the internet, etc. Additionally, a third client device, fourth client device, fifth client device, etc. may also upload building plans to the system 100 in similar fashion. In addition, or in the alternative, the first client device may also upload building plans to the system 100 in similar fashion.

In step 306, after receiving the building plans from second client device 204b or third client device, fourth client device, etc. The building plan navigation system 100 may combine content items that have been given combination assignments. For example, if the second client device 204*b* uploaded content items and two or more of the content items represent a single floor plan, or other substructure within the building represented by the building plan, and the second client device 204*b* placed combination assignments on the two or more content items, system 100 may combine the two or more content items such that the floor plan represented by the content items is completed and not broken up. This may be done for all floors, or any other substructures, that are broken up into two or more content items and have been given combination assignments.

In step 308, the building plan navigation system may link building plan content items according to relationship assignments provided. For example, system 100 may recognize relationship assignments placed on the content items, which may be in the form of related reference indicia, such as reference points, placed on similar geographical locations on different floor plan levels. After recognizing the related reference indicia, the system 100 may link related reference indicia together. The reference indicia, such as reference points, may come in a number of different varieties. For example, reference points may be up down reference points where the reference points indicate similar geographical locations on different floor plan levels. For these up down reference points, the system 100 may link all of the up down reference points together. For example, system 100 may link an up down reference point on a main floor with an up down reference point on a basement floor and to an up down reference point on the upper floor. Similarly, the system 100 may link the up down reference point on the upper floor to an up down reference point in an attic plan such that all of the up down reference points are linked together.

Reference points may also be forward backward reference points that are on the same floor. For example, a forward backward reference points may be at an entryway, a hallway and a family room that are all in line in a forward backward manner. These may all be linked in similar fashion by system 100. Similarly, reference points may also be left right reference points. For example, a left right reference point at a family room, a dining room and a kitchen that are all in line in left to right manner. These may all be linked in similar fashion by system 100.

A reference point may be a combination of the different reference point varieties, for example, a reference point at a family room may be an up down reference point, a forward backward reference point and a left right reference point which the system 100 may link to other up down reference points, other forward backward reference points and other left right reference points.

One skilled in the art would recognize that the system 100 described above would not only work in residential settings but would also work for commercial structures. For example, the same system would work for office buildings with multiple floors, warehouses, schools, or other commercial structures. One skilled in the art would also recognize that system 100 may also be implemented in a variety of other settings and industries in which design, structural, technical, or other informative or instructional drawings are used. For example, the system 100 may be implemented in connection with mechanical drawings for machinery or other mechanical products, electronic schematics, industrial design drawings or any other field or industry in which drawings are used.

In step 310, after the system 100 has modified and arranged the building plan in accordance with the combination and relationship assignments, the system 100 may provide the first client device 204*a* access to the modified building plan through a graphical user interface. The first client device 204 may view the modified building plan, download the modified building plan, store the modified building plan, etc.

In step 312, after receiving access to the modified building plan, the first client device 204*a* may then view the modified building plan, as described below and also make additional combination and relationship assignments as described above. Additionally, first client device 204*a* may change or modify existing combination and relationship assignments.

In step 314, after making additional combination and relationship assignments and/or after modifying existing combination and relationship assignments, first client device 204*a* may provide the building plan back to the system 100 with the additional and/or modified combination and relationship assignments.

In addition, or alternatively, the system may further provide access to the modified building plan to a second client device, third client device, fourth client device, etc. The users of the second client device, third client device, fourth client device, etc. may also view the modified building plan and make additional combination and relationship assignments as described above. Furthermore, the users may also change or modify existing combination and relationship assignments. After new assignments or modifications are made, the users may provide the building plan back to the system with the additional and/or modified combination and relationship assignments. In this manner, the system may allow a plurality of users to work together on a single or multiple building plans.

In step 316, similar to step 306 described above, the system 100 may combine the content items of the building plan according to the additional or modified combination assignments received by the first client device 204*a* or by a plurality of additional users as described above.

In step 318, similar to step 308 described above, the system 100 may link the content items of the building plan according to the additional or modified reference points and relationship assignments received by the first client device 204*a* or by a plurality of additional users as described above.

In step 320, after the system 100 has applied any and all of the combination and relationship assignments, the system 100 may apply navigational tools to the building plan. For example, the system 100 may recognize each of the links applied between the reference points according to the relationship assignments and link a navigational tool provided on a graphical user interface to one of the reference points applied to the building plan. The navigational tools may allow the first client device 204*a* to navigate through the reference points through the links created according to the relationship assignments. For example, the first client device 204*a* may navigate right, left, forward and backward to reference points located on the same floor of the building plan through the use of the navigational tool. Furthermore, the first client device 204*a* may navigate up and down to reference points on different floors of the building plan according to the links created according to the relationship assignments.

In step 322, after applying the navigational tools as described above, the system 100 may provide the resulting building plan to the first client device for viewing and navigation. In addition, or in the alternative, the system 100 may provide the resulting building plan to a second client device, a third client device, a fourth client device, and so on.

Figure 4:
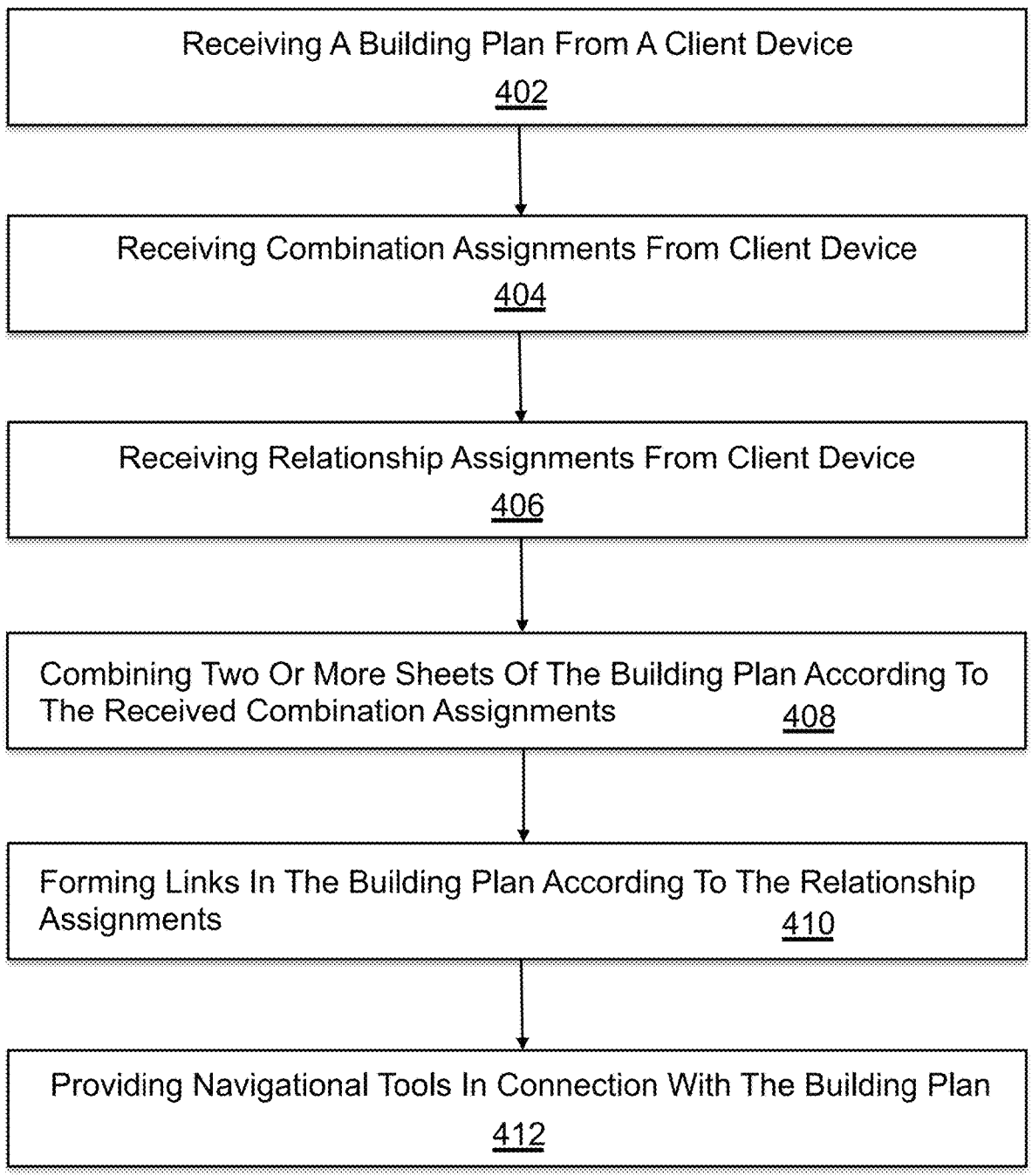
FIG. 4 illustrates a flow diagram of a method of navigating building plans in accordance with one or more embodiments described herein.

With reference now to FIG. 4, a flowchart of one exemplary method 400 of navigating building plans in accordance with one or more principles described herein is illustrated. While FIG. 4 illustrates example steps according to one embodiment other embodiments may omit, add to, place in a different order, and/or modify any of the steps shown in FIG. 4. One or more of the steps of method 400 may be performed by any of the components described in connection with system 100 of FIG. 1. In addition, one or more steps of method 400 may be performed by client device 204, online building plan navigation system 100, or a combination of both.

Step 402 may be included in method 400 and may include receiving a building plan from a client device 204. For example, step 402 may include receiving a building plan of a residential structure such as a home, a commercial structure such as an office building, apartment complex, school, or a building plan of any other structure to be built. In particular, as described in more detail above, building plan manager 102 may receive a building plan from a user 202 by way of a client device 204. The building plan received may be from a user 202 through a client device 204 having a username and password associated with the user 202.

Method 400 may further include step 404 of receiving combination assignments from client device. As described above, the combination assignments may be made by a user 202 through a graphical user interface on a client device which may then be received by a combination manager 104. Combination assignments may be made in connection with two or more sheets of a building plan that represent a single floor plan.

In addition, or in the alternative, a step of providing suggestions of combination assignments may also be included. In connection with this step, a user may choose to accept or reject the suggested combination assignments. Furthermore, the step may include automatically making combination assignments that may later be modified or changed.

Method 400 may further include step 406 of receiving relationship assignments from client device. As described above, the relationship assignments may be made by a user 202 through a graphical user interface on a client device which may then be received by a relationship manager. In more detail, relationship assignments may be made by placing reference indicia, such as reference points, on the building plan and relationship assignments in association with the reference indicia.

In addition, or in the alternative, a step of providing suggestions of relationship assignments and placement of reference indicia may also be included. In connection with this step, a user may choose to accept or reject the suggested relationship assignments and placement of reference indica. Furthermore, the step may include automatically making relationship assignments and automatically placing reference indicia that may later be modified or changed.

Step 408 may also be included which may be combining two or more content items of the building plan according to the received combination assignments. As described above, the combining of two or more content items of the building plans may be executed by the combination manager 104. In this step, two or more content items of a building plan representing a single floor level or other substructure may be combined such that the floor level is represented in one depiction. This step 408 may additional include combining two or more content items of a second floor level, a third floor level, other substructure, etc.

Step 410 may also be included which may be forming links in the building plan according to the received relationship assignments. As described above, the forming of links in the building plan may be executed by the relationship manager 106. In this step, links may be formed between various reference indicia, such as reference points, on the building plan. For example, the links may be formed between up down reference points as described herein. Furthermore, links may be made between forward backward reference points as described herein. Links may also be made between left right reference points as also described herein.

Step 412 may include providing navigational tools in connection with the building plan. As described above, the navigational tools may be provided and linked to the reference points by the navigation manager 110. The navigational tools may allow a client device to move through the building plan content items that have been modified in accordance with the received combination and relationship assignments. The navigation tools may also provide a client device with information related to the navigation of the building plan such as direction being faced, scale of the view, and the name of the specific sheet currently being viewed by the client device.

Figure 5:
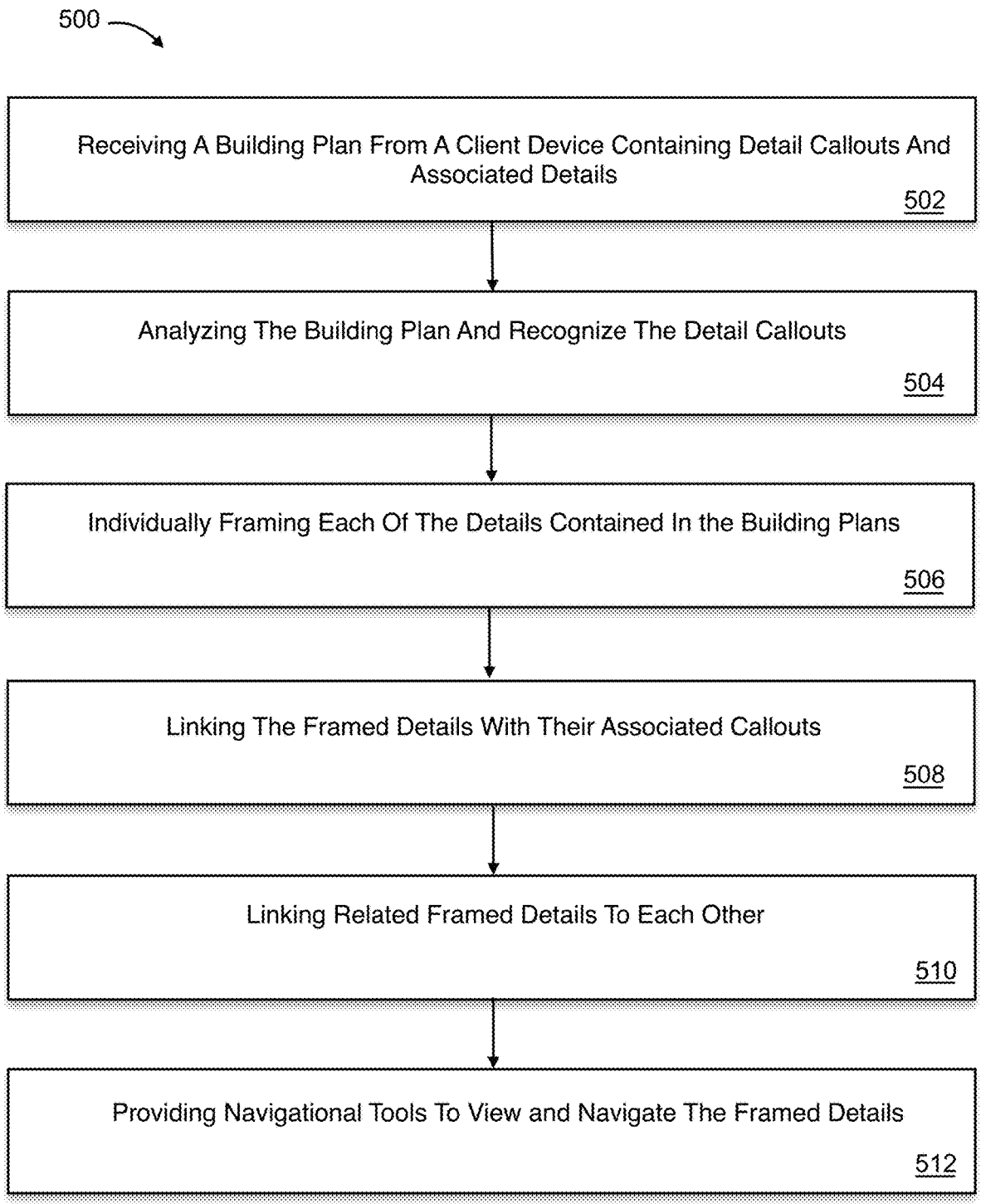
FIG. 5 illustrates another flow diagram of a method of navigating building plans in accordance with one or more embodiments described herein.

With reference now to FIG. 5, a flowchart of another exemplary method 500 of navigating building plans in accordance with one or more principles described herein is illustrated. While FIG. 5 illustrates example steps according to one embodiment other embodiments may omit, add to, place in a different order, and/or modify any of the steps shown in FIG. 5. One or more of the steps of method 500 may be performed by any of the components described in connection with system 100 of FIG. 1. In addition, one or more steps of method 500 may be performed by client device 204, online building plan navigation system 100, or a combination of both.

Step 502 may be included in method 500 and may include receiving a building plan containing detail callouts and associated details from a client device. Similar to step 402 of method 400 described above, step 402 may include receiving a building plan having detail callouts and associated details of a residential structure such as a home, a commercial structure such as an office building, apartment complex, school, or a building plan of any other structure to be built. In particular, as described in more detail above, building plan manager 102 may receive a building plan containing detail callouts and associated details from a user 202 by way of a client device 204. The building plan received may be from a user 202 through a client device 204 having a username and password associated with the user 202.

Method 500 may further include step 504 which may include analyzing the received building plan to find and recognize the detail callouts. As described above, the analysis of the building plan and recognition of the detail callouts may be completed by the callout manager 108.

Method 500 may further include step 506 which may include individually framing each of the details contained in the building plans so as to place the details into their own detail items. As described above, the individual framing of the details may be accomplished by the callout manager 108. More specifically, building plans often contain details which are traditionally displayed together on the same sheets of a building plan. Step 506 may include recognizing the individual details and separating the individual details from the other details by framing each detail into their own detail items.

Step 508 may also be included which may include linking the framed details with their associated callouts. As described above, the linking of the framed details with their associated callouts may be accomplished by the callout manager 108. More specifically, framed details may be linked with callouts that were previously found and recognized in step 504.

Step 510 may also be included which may include linking related framed details to each other. As described above, the linking of the related framed details to each other may also be accomplished by the callout manager 108. In more detail, the framed details may be related to each other by location on a building plan. For example, a room in a building plan may have five callouts, one representing a detail of a north wall, one representing a detail of an east wall, one representing a detail of a south wall, one representing a detail of a west wall, and one representing a detail of a ceiling. These related details may all be linked to each other. Furthermore, this step, or alternatively a separate step, may include linking a group of linked framed details to the closest reference indicia, such as a reference point. Returning to the same example, the room with the five callouts may have had a reference point place in association with the room. The group of linked callouts may be linked to this reference point.

Step 512 may also be included in method 500 and may include providing navigational tools to view and navigate the framed details. As described above, the navigational tools may be provided and linked to the reference points by the navigation manager 110. The navigational tools may allow a client device to navigate through the building plan sheets and through the grouped details once reaching a reference point, or other reference indicia, that is linked to the grouped details. For example, once a client device reaches a reference point linked to a group of framed details, the client device may navigate from the reference point to a first framed detail, from the first framed detail to a second framed detail, from the second framed detail to a third framed detail, etc.

Figure 6A:
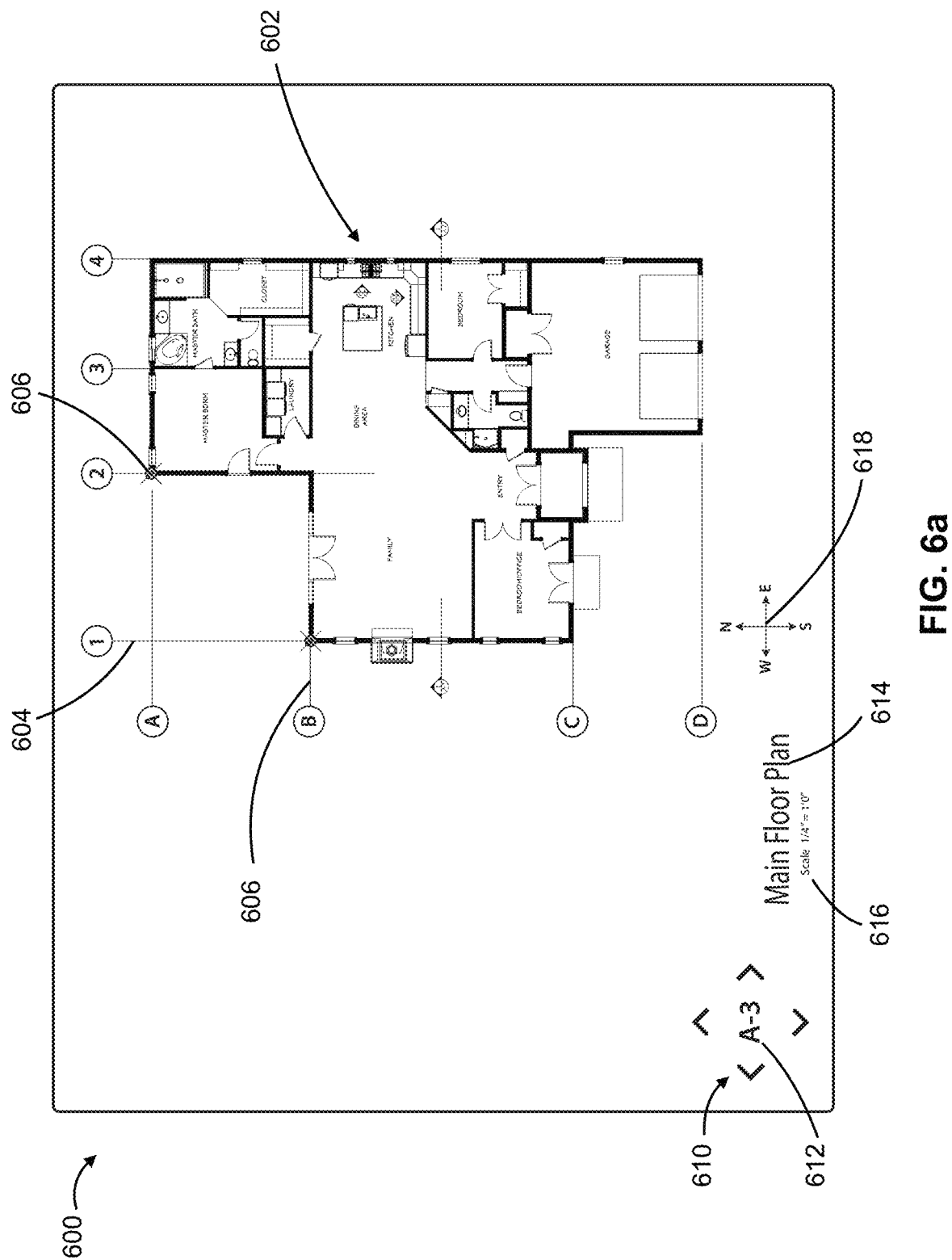
FIG. 6a illustrates a desktop graphical user interface of the building plan navigation system showing a main floor plan.
Figure 6B:
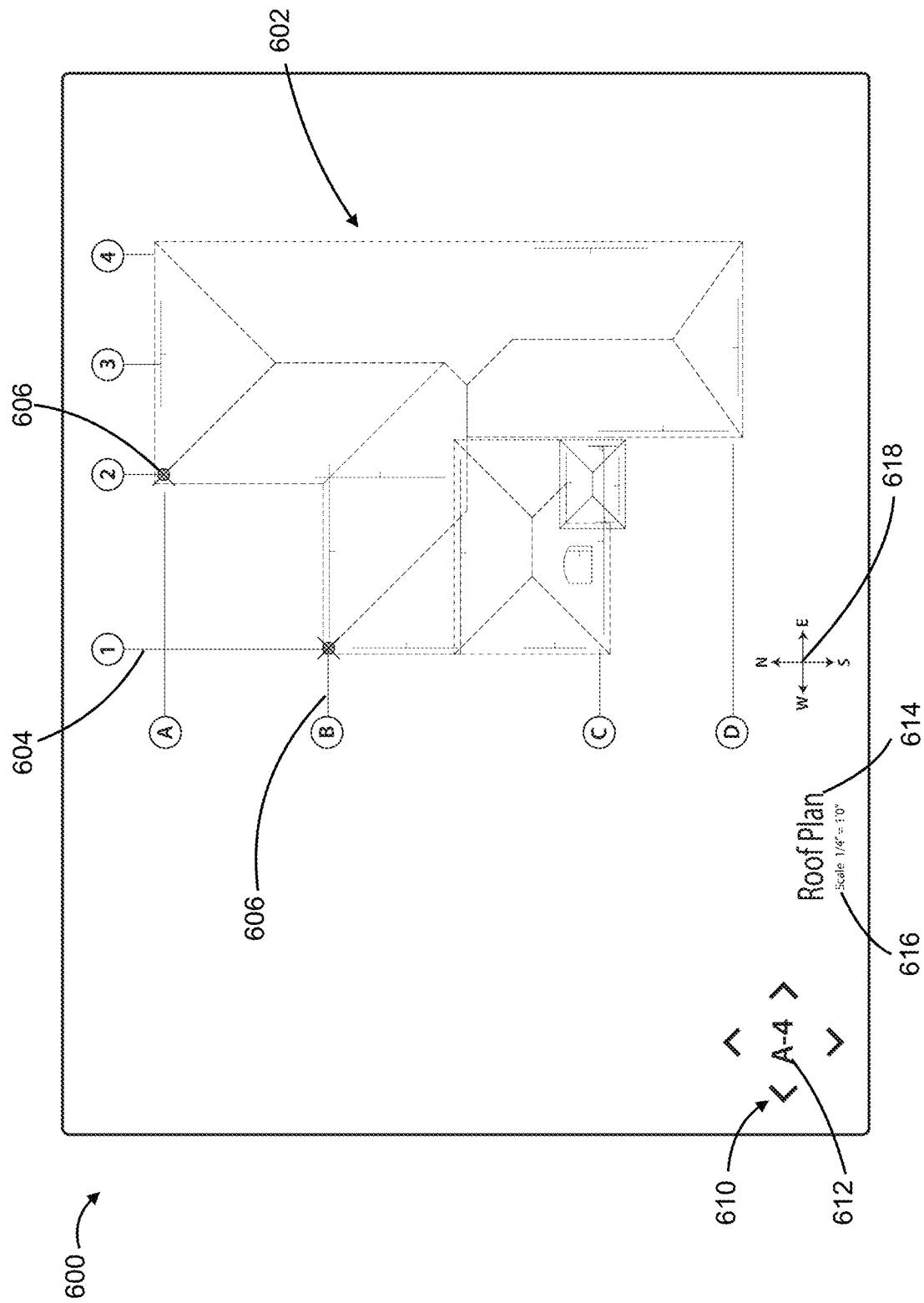
FIG. 6b illustrates a desktop graphical user interface of the building plan navigation system showing a roof plan.
Figure 6C:
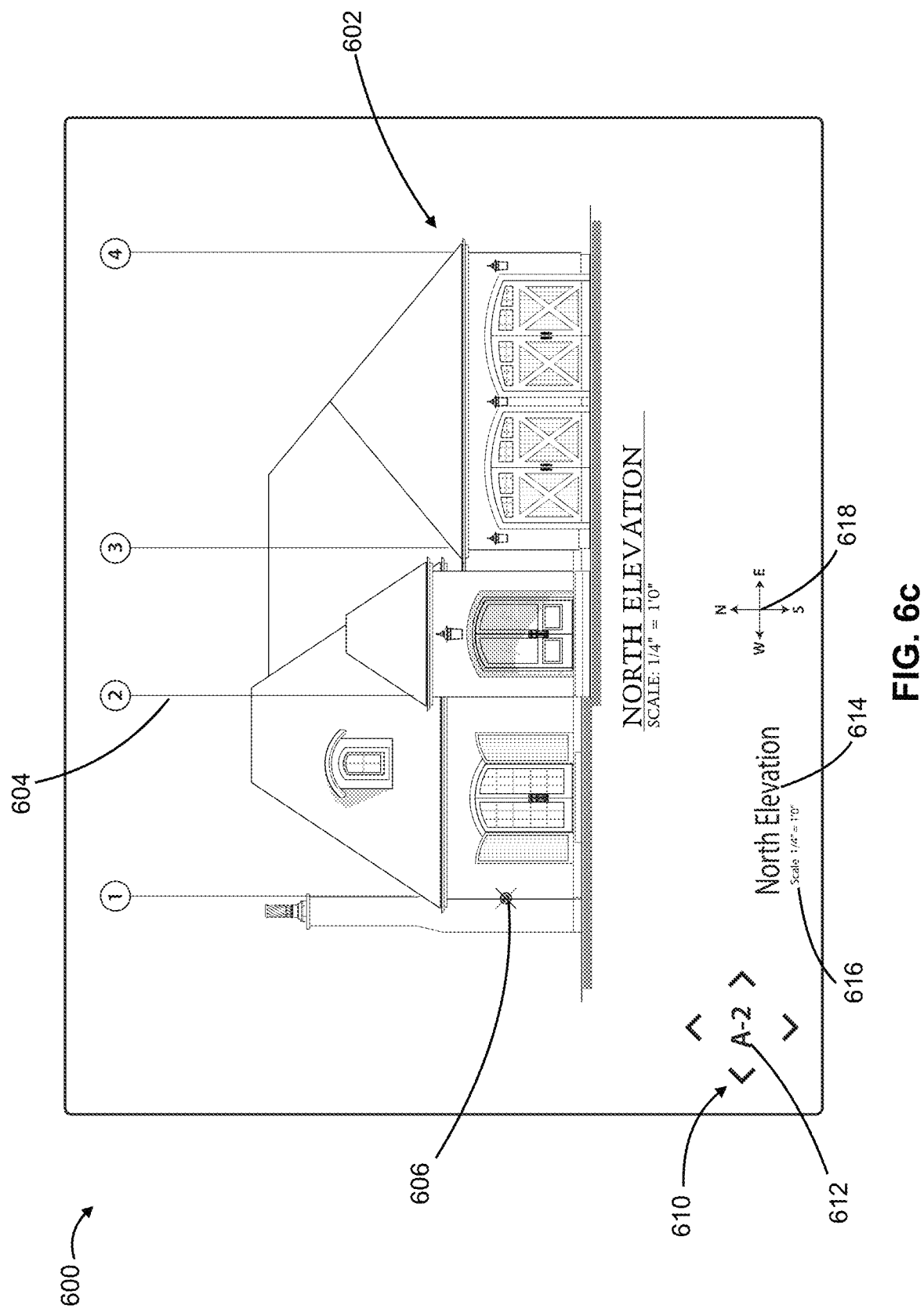
FIG. 6c illustrates a desktop graphical user interface of the building plan navigation system showing a north elevation.
Figure 7A:
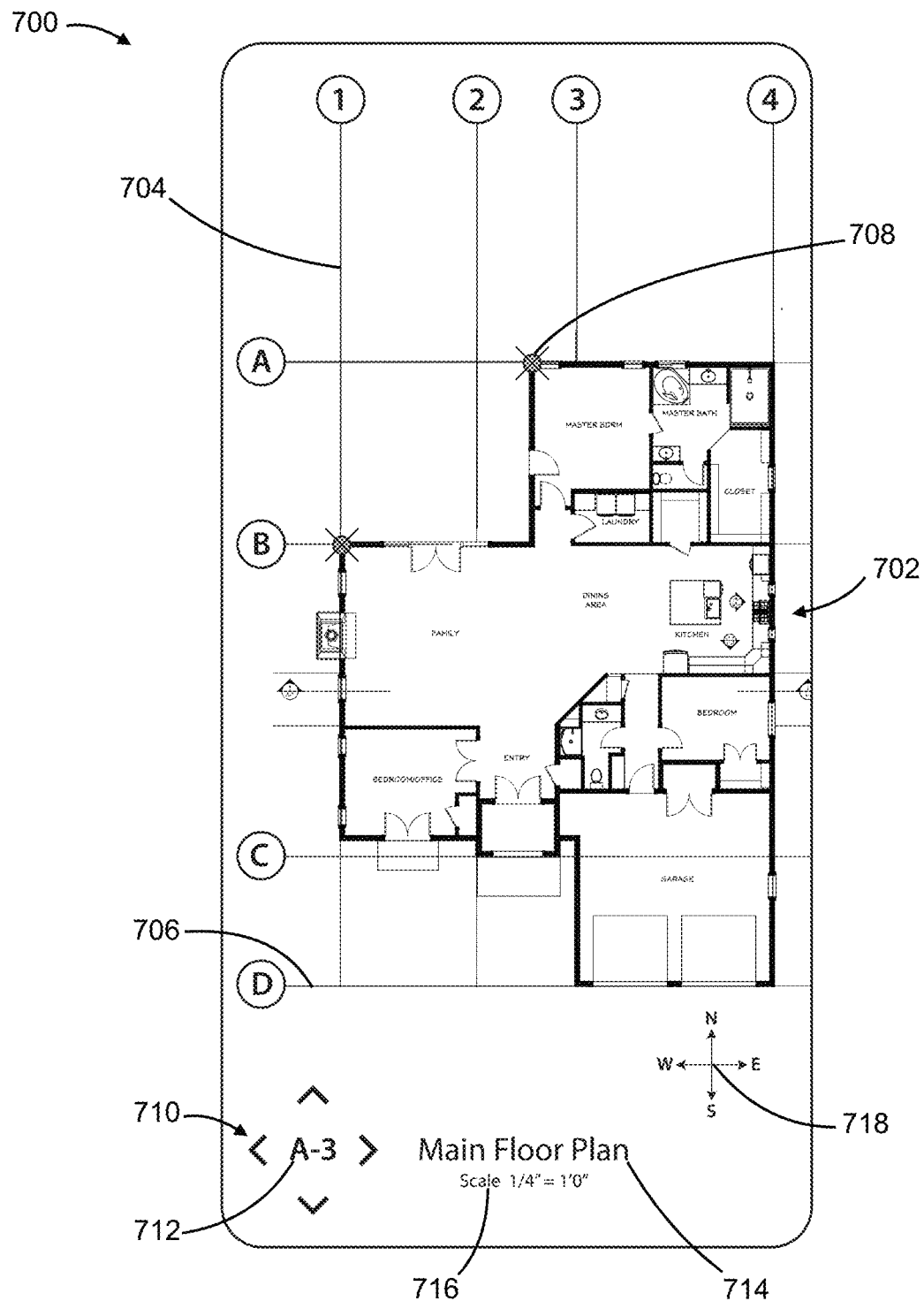
FIG. 7a illustrate a mobile graphical user interface of the building plan navigation system showing a main floor plan.
Figure 7B:
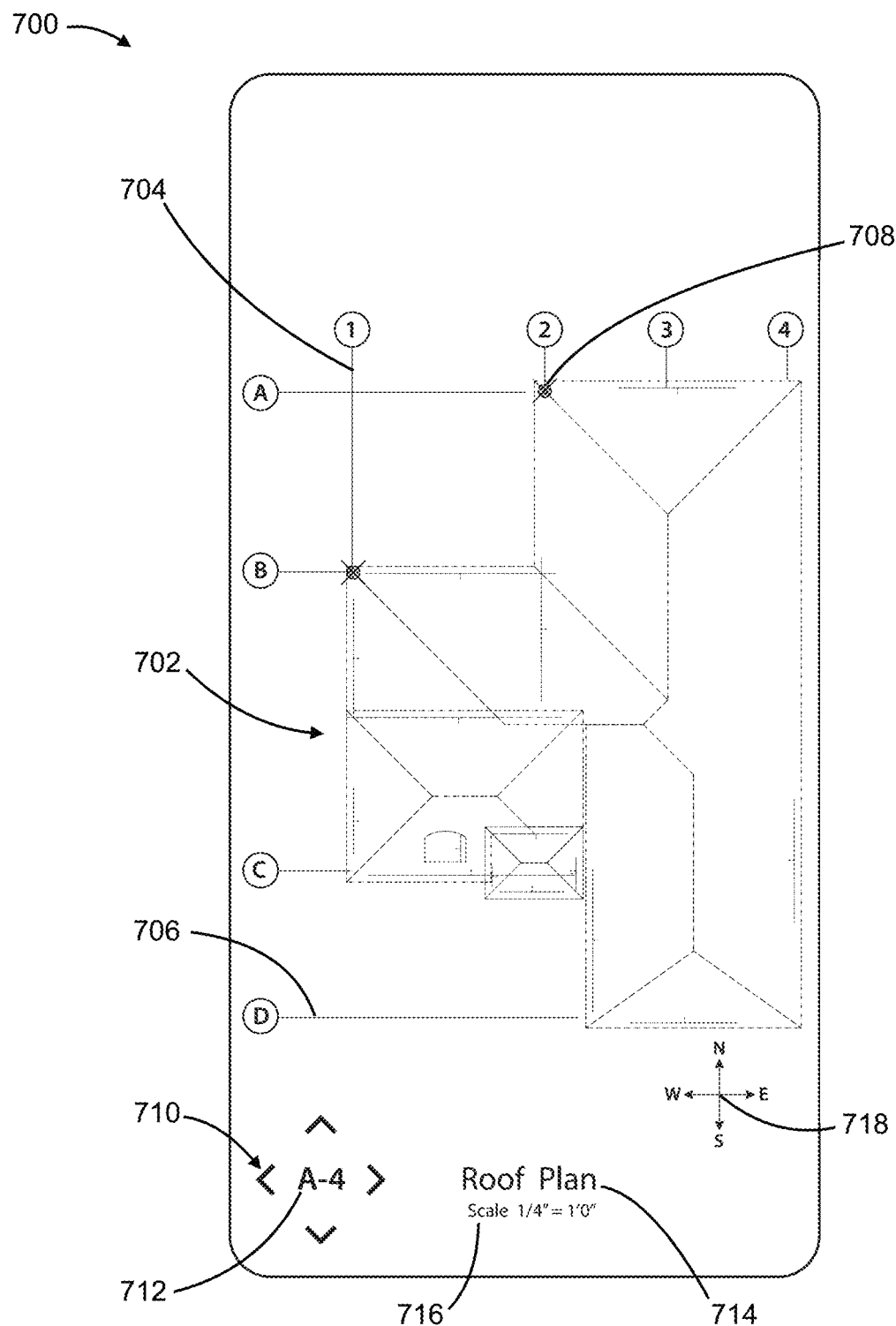
FIG. 7b illustrates a mobile graphical user interface of the building plan navigation system showing a roof plan.
Figure 7C:
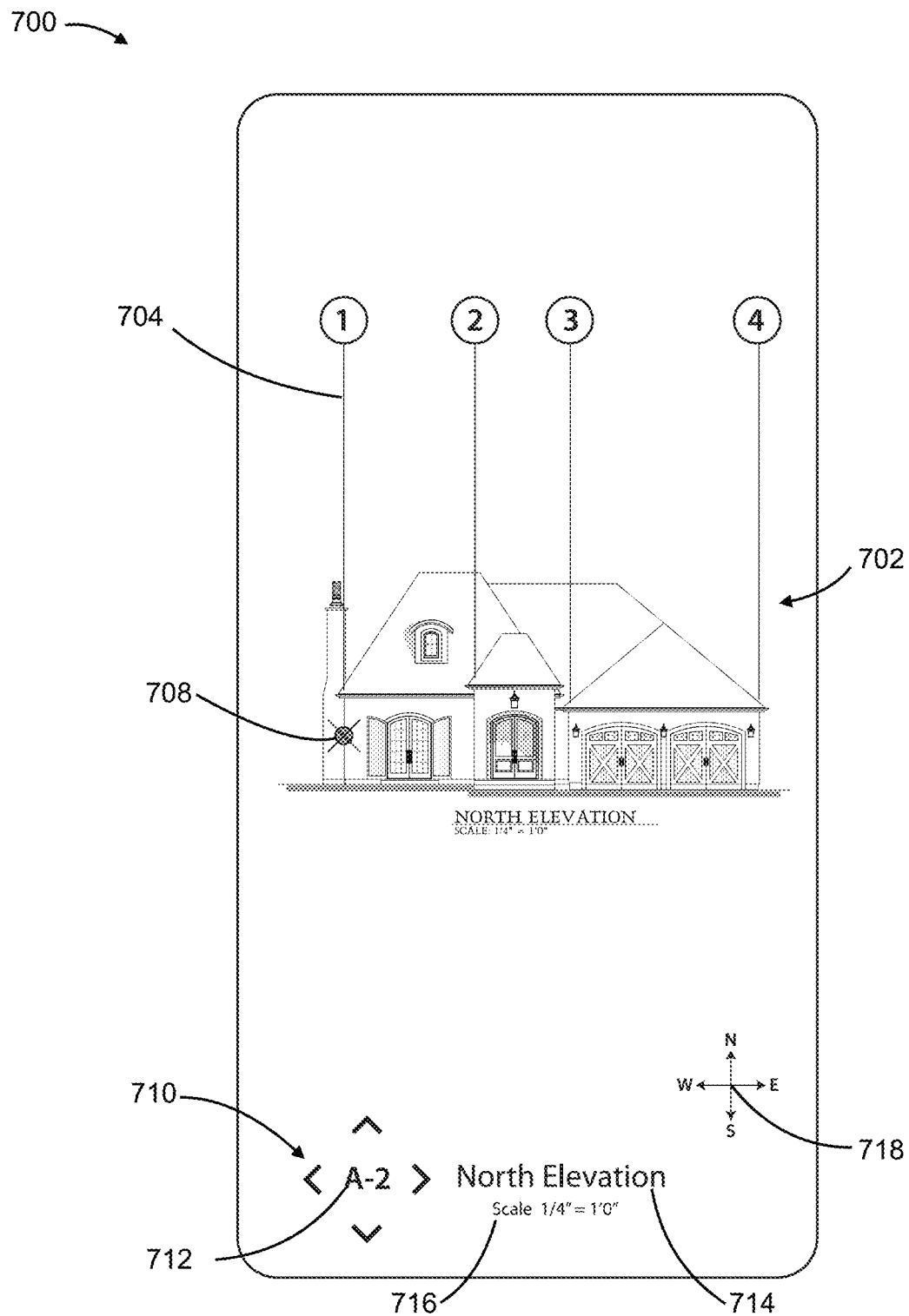
FIG. 7c illustrates a mobile graphical user interface of the building plan navigation system showing a north elevation.

With reference now to FIGS. 6a-c and 7a-c, graphical user interfaces of the system 100 are illustrated. FIGS. 6a-c illustrate a mobile graphical interface while FIGS. 7a-c illustrate a desktop graphical interface similar to FIGS. 6a-c. It should be noted that similar concepts and parts of the graphical user interfaces illustrated may be applied in other settings as well, such as on a tablet device. The graphical user interfaces 600 and 700 may show various content items of a building plan 602 and 702 as described above and may also include reference indicia which may include, but is not limited to, one or more of the following: a plurality of vertical grid lines 604 and 704, a plurality of horizontal grid lines 606 and 706, and one or more reference points 608 and 708. The graphical user interfaces 600 and 700 may further include, but is not limited to, one or more of the following: a navigational tool 610 and 710, an indicator of sheet number 612 and 712, an indicator of sheet name 614 and 714, a viewing scale 616 and 716, and a directional compass 618 and 718.

As described above, the graphical user interfaces 600 and 700 may include a plurality of vertical grid lines 604 and 704 and a plurality of horizontal grid lines 606 and 706. The vertical grid lines 604 and 704 and the horizontal grid lines 606 and 706 may orthogonally intersect each other. The plurality of vertical grid lines 604 and 704, and similarly the plurality of horizontal grid lines 606 and 706, may not be equally spaced apart, but rather may be positioned on the building plan in accordance with the represented structure. Furthermore, the vertical 604 and 704 and horizontal 606 and 706 grid lines may be movable by a user of the graphical user interface. In addition, the vertical 604 and 704 and horizontal 606 and 706 grid lines may be uniform no matter the floor plan, sheet or file that is displayed. For example, when relevant, the grid lines 604, 606, 704, and 706 will display on a main floor plan as shown in FIGS. 6a and 7a, on a roof plan as shown in FIGS. 6b and 7b, on an elevational view as shown in FIGS. 6c and 7c, etc.

The graphical user interfaces 600 and 700 may also include reference points which may indicate similarly positioned or otherwise related points in the structure. For example, the reference point 608a in FIGS. 6a and 708 in FIG. 7a indicates a point on the Northwest corner of the family room. This reference point is related to and may be linked to reference point 608a on FIGS. 6b and 708a on FIG. 7b respectively. Furthermore, these reference points may also be related to and linked to reference point 608a on FIGS. 6c and 708a on FIG. 7c. As described above, the reference points are linked so that they may be navigated to by a user of the graphical user interfaces 600 and 700.

As indicated above, the graphical user interfaces 600 and 700 may also include navigational tool 610 and 710, an indicator of sheet number 612 and 712, an indicator of sheet name 614 and 714, a viewing scale 616 and 716, and a directional compass 618 and 718. The navigation tool 610 and 710, may include up, down, right and left arrows that allow the user to navigate the building plans on the graphical user interface by navigating to and from the various linked reference points as described above. In addition, the graphical user interfaces 600 and 700 may be comprised of various indicators to keep a user informed as to what they are viewing. For example, the indicator of sheet number 612 and 712 indicates to the user the sheet number of the building plan that the user is viewing on the graphical user interfaces 600 and 700. The sheet number indicated by the indicator 612 and 712 may change according to the sheet or file navigated to by the user of the graphical user interfaces 600 and 700. The indicator of sheet name 614 and 714 similarly may indicate to a user the name of the sheet or file that is being viewed and may change according to the sheet or file navigated to by the user. The viewing scale 616 and 716 may show the user the current scale of the building plan being viewed. When zooming in or zooming out, the viewing scale 616 and 716 may also change according to the how zoomed in or zoomed out the user is viewing the building plan. The directional compass 618 and 718 indicates to the user the direction being faced and may change depending on where the user is navigating. For example, if the user is facing a North wall, the directional compass 618 and 718 will have an "N" or other indicator of North at the top, if the user is facing a South wall, the directional compass 618 and 718 will display an "S" or other indicator of South at the top.

Figure 8:
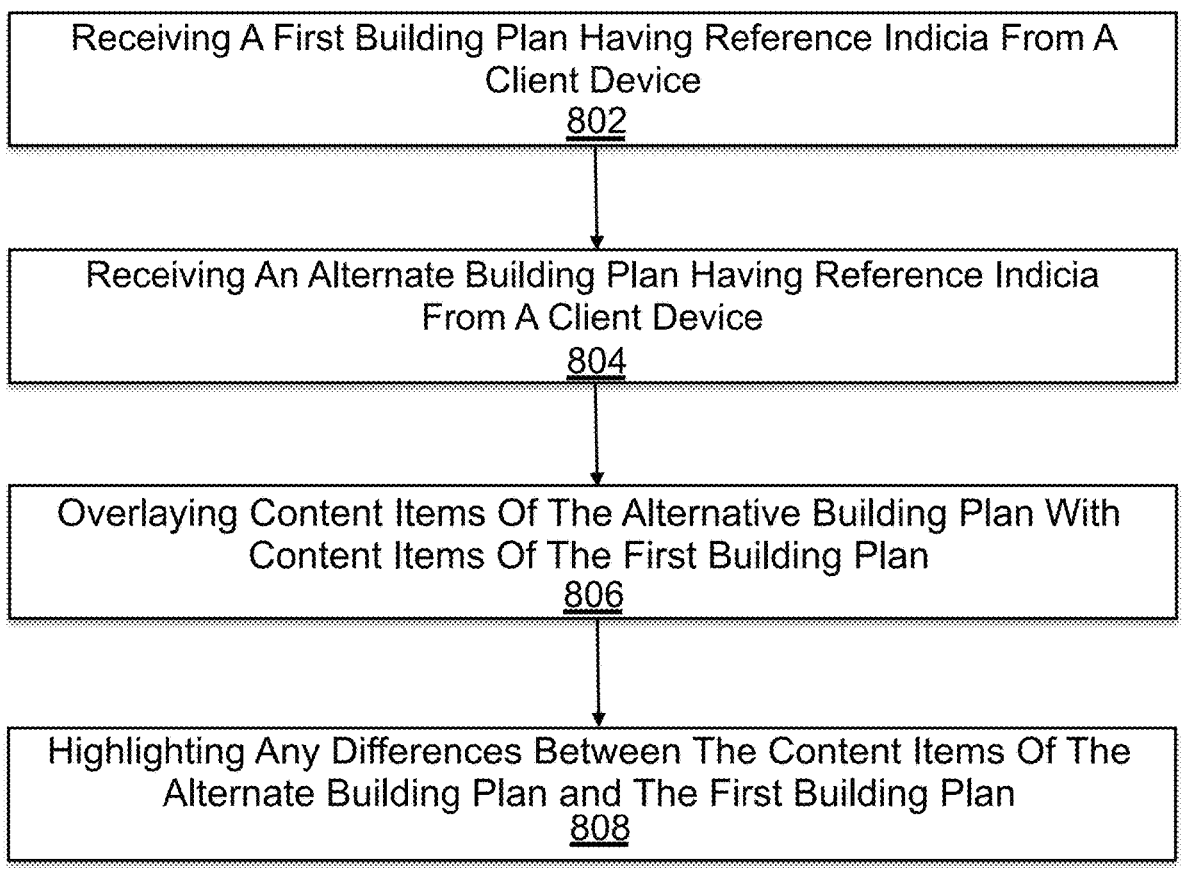
FIG. 8 illustrates a flow diagram of a method of comparing building plans in accordance with one or more embodiments described herein.

With reference now to FIG. 8, a flowchart of an exemplary method 800 of comparing building plans in accordance with one or more principles described herein is illustrated. While FIG. 8 illustrates example steps according to one embodiment, other embodiments may omit, add to, place in a different order, and/or modify any of the steps shown in FIG. 8. One or more of the steps of method 800 may be performed by any of the components described in connection with system 100 of FIG. 1. In addition, one or more steps of method 800 may be performed by client device 204, online building plan navigation system 100, or a combination of both.

Step 802 may be included in method 800 and may include receiving a first building plan having reference indicia and links from a client device. The first building plan may be received identically to what has been described above in connection with step 402 of method 400. The first building plan may be received with reference indicia and links already applied to the content items of the building plan. Alternatively, if the first building plan does not have reference indicia and links already applied, the first building plan may go through the method(s) 400 and/or 500 as described above to have reference indicia and links applied.

Method 800 may further include step 804 which may include receiving an alternate building plan having reference indicia and links from a client device. The alternate building plan received may be for the same structure to be built as the first building plan of step 802. However, the alternate building plan may have one or more modifications from the first building plan of step 802. The alternate building plan may be received identically to what has been described above in connection with step 402 of method 400. The alternate building plan may be received with reference indicia and links already applied to the content items of the alternate building plan. Alternatively, if the alternate building plan does not have reference indicia and links already applied, the alternate building plan may go through the method(s) 400 and/or 500 as described above to have reference indicia and links applied. Since the alternate building plan is for the same structure as the first building plan of step 802, the reference indicia and links of the alternate building plan may be identical to the reference indicia and links of the first building plan of step 802.

Step 806 may also be included in method 800 which may be overlaying the content items of the alternate building plan with the content items of the first building plan. The overlaying may be accomplished through use of the reference indicia and links applied to the content items of the first building plan and to the content items of the alternate building plan. For example, since the reference indicia, such as reference points, may be identical between the alternate building plan and the first building plan, the reference points of the content items of the alternate building plan may be overlayed on top of the matching reference points of the content items of the first building plan. The overlaying may be done automatically by the system or may be done manually by a user 202 of a client device 204.

All of the content items of the alternate building plan may be overlayed over all of the content items of the first building plan as described above. Alternatively, one or more content items of the alternate building plan may be overlayed over all of or one or more of the content items of the alternate building plan. More specifically, one or more content items of the alternate building plan may be overlayed over one or more content items of the first building plan through use of matching or linked reference points. By way of example, but not limiting in its application, a roof plan of the alternate building plan may have a roof reference point which is identical to a roof reference point of a roof plan of the first building plan which is linked to an upstairs floor plan reference point, which is linked to a main floor reference point which is in turn linked to a basement reference point. The roof plan of the alternate building plan may be overlayed over each of the roof plan, the upstairs plan, the main floor plan, and the basement plan of the first building plan by first aligning and overlaying the roof plan reference point of the alternate building plan with the roof plan reference point of the first building plan. The roof plan and associated roof plan reference point may then be duplicated and aligned with and overlayed over each of the refence points of the upstairs plan, the main floor plan, and the basement plan of the first building plan. In this manner, the roof plan of the alternate building plan may be aligned and overlayed over each of the roof plan, the upstairs plan, the main floor plan, and the basement plan of the first building plan. Similar to what has just been described, more than one reference point may be used to overlay content items of the alternate building plan over content items of the first building plan.

Step 808 may also be included in method 800 which may include highlighting any differences between the content items of the alternate building plan and the content items of the first building plan. In the case that identical content items are being compared, any differences may be highlighted or otherwise marked. For example, when a roof plan of the alternate building plan is compared with a roof plan of the first building plan, any differences between the two roof plans will be highlighted. Alternatively, when different content items are compared between the alternate building plan and the first building plan, select features may be compared and highlighted. For example, when a first-floor plan and a second-floor plan are compared to each other, an elevator shaft, or some other feature or structure common to two or more floor plans, may be selected and any differences in the elevator shaft, or other feature or structure, between the first-floor plan and the second-floor plan may be highlighted.

Figure 9:
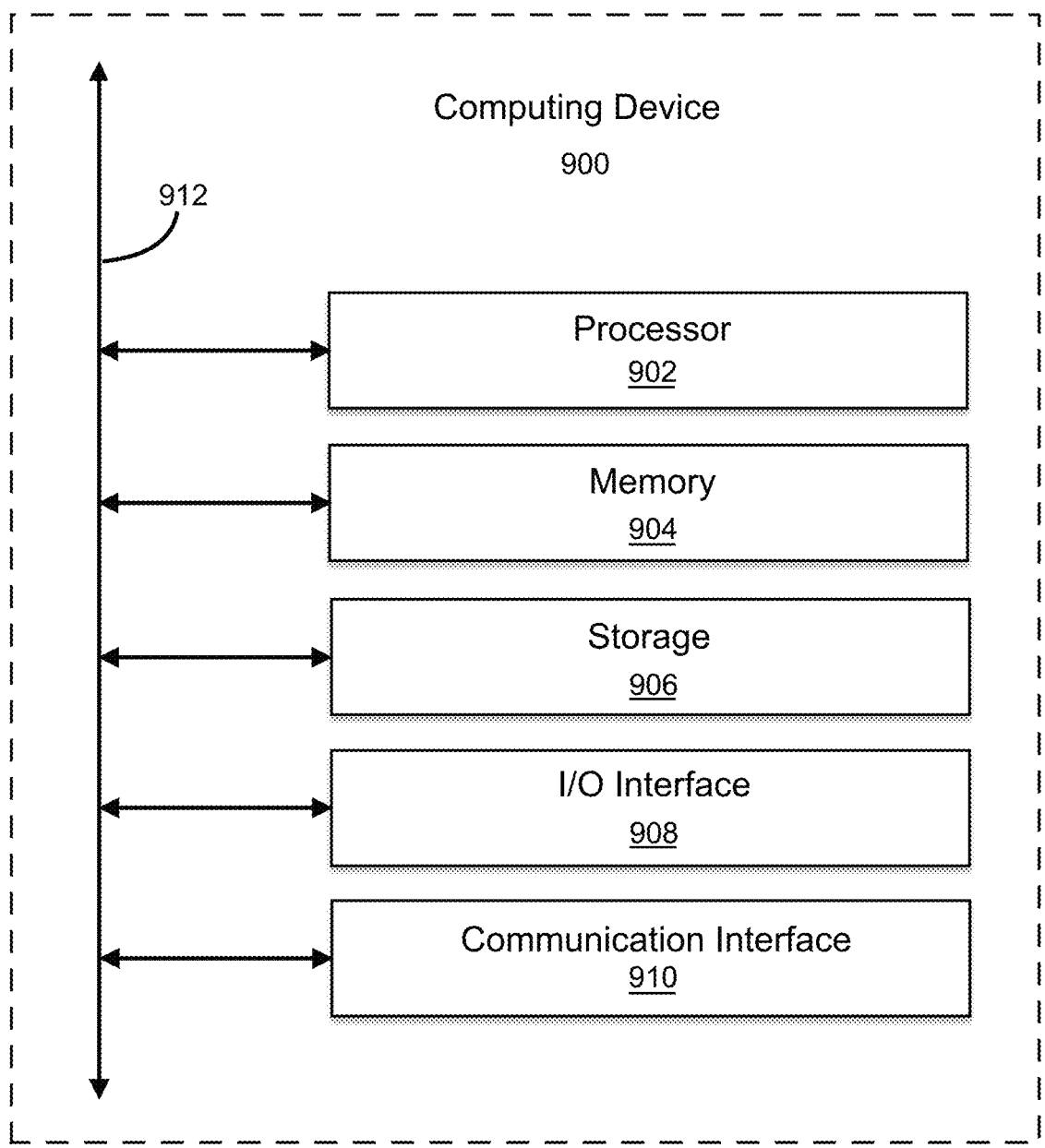
FIG. 9 illustrates a block diagram of a computing device in accordance with one or more embodiments.

With reference now to FIG. 9, an exemplary computer device 900 is illustrated that may be configured to perform one or more of the processes described above. One skilled in the art will understand that one or more computing devices such as the computing device 900 may implement the building plan navigation system 100. As shown by FIG. 9, the computing device 900 may comprise a processor 902, memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 may include fewer components than those shown in FIG. 9. Components of the computing device 900 shown in FIG. 9 will now be described in additional detail.

In particular embodiments, the processor 902 may include hardware for executing instructions, such as those making up a computer program. As an example and not by way of limitation, to execute instructions, the processor 902 may retrieve the instructions from an internal register, an internal cache, the memory 904, or the storage device 906 and decode and execute them. In particular embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a Solid State Drive ("SSD"), Flash Memory, Phase Change Memory ("PCM"), or other types of data storage. The memory 904 may be internal or distributed memory.

The storage device 906 may include storage for storing data or instructions. As an example, and not by way of limitation, the storage device 906 may comprise a non-transitory storage medium described above. The storage device 906 may include a hard disk drive (HHD), a floppy disk drive, flash memory, an optical disc, a magneto-optical disc, magnetic tape, or a Universal Serial Bus (USB) drive or a combination of two or more of these. The storage device 906 may be internal or external to the computing device 900. In particular embodiments, the storage device 906 may be non-volatile, solid-state memory. In other embodiments, the storage device 906 may include read only memory (ROM). Where appropriate, this ROM may be masked programmed ROM, programmable ROM (PROM), erasable PROM (EPROM), electrically erasable PROM (EEPROM), electrically alterable ROM (EAROM), or flash memory or a combination of two or more of these.

The I/O interface 908 may allow a user to provide input to, receive output from, and otherwise transfer data to and receive data from the computing device 900. The I/O interface 908 may include a mouse, a trackpad, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more audio speakers, and one or more audio drivers. In certain embodiments, the I/O interface 908 is configured to provide graphical data to a display for presentation to a user. The graphical data may be representative of one or more graphical user interfaces or any other graphical content as may serve a particular implementation.

The communication interface 910 may include hardware, software, or both. In any event, the communication interface 910 may provide one or more interfaces for communication (such as, for example, packet-based communication) between the computing device 900 and one or more other computing devices or networks. As an example, and not by way of limitation, the communication interface 910 may include a network interface controller (NIC) or network adapter for communication with an Ethernet or other wireless based network or a wireless NIC (WNIC) or wireless adapter for communicating with a wireless network, such as a WI-FI.

Additionally, or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a GLOBAL System for Mobile Communications (GSM) network), or other suitable wireless network or a combination thereof.

Additionally, the communication interface 910 may facilitate communications via various communication protocols. Examples of communication protocols that may be used include, but are not limited to, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML"), JavaScript Object Notation ("JSON"), and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("FR") signaling technologies, Long Term Evolution ("LTE") technologies, wireless communication technologies, in-band and out-of-band signaling technologies, and other suitable communications networks and technologies.

The communication infrastructure 912 may include hardware, software or both that couple components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LCP) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Although several embodiments have been described in detail for purpose of illustration, various modifications may be made without departing from the scope and spirit of the invention. Accordingly, the invention is not to be limited except as by the appended claims.

What is claimed is:

1. A method comprising:
   receiving a 2D building plan comprised of a plurality of 2D content items wherein the plurality of 2D content items contain information related to the construction of a structure;
   identifying any sets of two or more of the plurality of 2D content items wherein each set of two or more of the plurality of 2D content items contains information related to construction of a substructure of the structure;
   combining the two or more 2D content items within each set into a single 2D content item containing all of the information related to the substructure of the set such that the number of the plurality of 2D content items is reduced from the original 2D building plan;
   forming locational links between the plurality of 2D content items wherein the locational links link one 2D content item to a second 2D content item; and
   providing, for display on a client device associated with a user, a navigational interface comprising navigational tools to navigate through the locational links of the linked 2D content items.

2. The method of claim 1, further comprising identifying 2D content items which contain one or more additional details of other 2D content items;
   separating the one or more additional details into separate 2D detail items; and
   linking the 2D detail items with their associated 2D content items.

3. The method of claim 2, further comprising linking two or more related 2D detail items to each other so as to form sets of linked related 2D detail items.

4. The method of claim 1, further comprising providing, to the client device associated with a user, suggested combinations of two or more 2D content items.

5. The method of claim 1, wherein the locational links link a first point representing a specific location in the structure in a first 2D content item to a second point representing a specific location in the structure in a second 2D content item wherein the locations represented by the first and second points are related.

6. The method of claim 1 further comprising placing one or more reference indicia on each of two or more of the plurality of 2D content items, wherein the placement of the one or more reference indicia is in association with specific locations of a structure represented by the 2D content item on which each reference indicia is placed and wherein the locational links are formed between reference indicia on different 2D content items.

7. The method of claim 6 further comprising receiving an alternate 2D content item, placing reference indicia on the alternate 2D content item in association with specific locations of a structure represented by the alternate 2D content item, overlaying the alternate 2D content item over an associated 2D content item, and highlighting any differences between the alternate 2D content item and the associated 2D content item, wherein the alternate 2D content item is an updated version of the associated 2D content item, and wherein related reference indicia of the alternate 2D content item and the associated 2D content item are aligned during the overlaying of the alternate 2D content item and the associated 2D content item.

8. A system comprising:
at least one processor; and
at least one non-transitory computer readable storage medium storing instructions that, when executed by the at least one processor, cause the system to:
receive a 2D building plan comprised of a plurality of 2D content items wherein the plurality of 2D content items contain information related to the construction of a structure;
identify any sets of two or more of the plurality of 2D content items wherein each set of two or more of the plurality of 2D content items contains information related to construction of a substructure of the structure;
combine the two or more 2D content items within each set into a single 2D content item containing all of the information related to the substructure of the set such that the number of the plurality of 2D content items is reduced from the original 2D building plan;
form locational links between the plurality of 2D content items wherein the locational links link one 2D content item to a second 2D content item; and
provide, for display on a client device associated with a user, a navigational interface comprising navigational tools to navigate through the locational links of the linked 2D content items.

9. The system of claim 8, further comprising instructions that, when executed by the at least one processor, cause the system to:
identify 2D content items which contain one or more additional details of other 2D content items; and
separate the one or more additional details into separate 2D detail items; and
link the 2D detail items with their associated 2D content items.

10. The system of claim 9, further comprising instructions that, when executed by the at least one processor, cause the system to:
link two or more related 2D detail items to each other so as to form sets of linked related 2D detail items.

11. The system of claim 8, further comprising instructions that, when executed by the at least one processor, cause the system to provide, to the client device associated with a user, suggested combinations of two or more 2D content items.

12. The system of claim 8, wherein the locational links link a first point representing a specific location in the structure in a first 2D content item to a second point representing a specific location in the structure in a second 2D content item wherein the locations represented by the first and second points are related.

13. The system of claim 8 further comprising instructions that, when executed by the at least one processor, cause the system to place one or more reference indicia on each of two or more of the plurality of 2D content items, wherein the placement of the one or more reference indicia is in association with specific locations of a structure represented by the 2D content item on which each reference indicia is placed and wherein the locational links are formed between reference indicia on different 2D content items.

14. The system of claim 13 further comprising instructions that, when executed by the at least one processor, cause the system to receive an alternate 2D content item, place reference indicia on the alternate 2D content item in association with specific locations of a structure represented by the alternate 2D content item, overlay the alternate 2D content item over an associated 2D content item, and highlight any differences between the alternate 2D content item and the associated 2D content item, wherein the alternate 2D content item is an updated version of the associated 2D content item, and wherein related reference indicia of the alternate 2D content item and the associated 2D content item are aligned during the overlaying of the alternate 2D content item and the associated 2D content item.

15. A non-transitory computer readable storage medium storing instruction that, when executed by at least one processor, cause a computer device to:
receive a 2D building plan comprised of a plurality of 2D content items wherein the plurality of 2D content items contain information related to the construction of a structure;
identify any sets of two or more of the plurality of 2D content items wherein each set of two or more of the plurality of 2D content items contains information related to construction of a substructure of the structure;
combine the two or more 2D content items within each set into a single 2D content item containing all of the information related to the substructure of the set such that the number of the plurality of 2D content items is reduced from the original 2D building plan;
form locational links between the plurality of 2D content items wherein the locational links link one 2D content item to a second 2D content item; and
provide, for display on a client device associated with a user, a navigational interface comprising navigational tools to navigate through the locational links of the linked 2D content items.

16. The non-transitory computer readable storage medium of claim 15, further comprising instructions that, when executed by the at least one processor, cause the system to:
identify 2D content items which contain one or more additional details of other 2D content items; and
separate the one or more additional details into separate 2D detail items; and
link the 2D detail items with their associated 2D content items.

17. The non-transitory computer readable storage medium of claim 16, further comprising instructions that, when executed by the at least one processor, cause the system to:

link two or more related 2D detail items to each other so as to form sets of linked related 2D detail items.

18. The non-transitory computer readable storage medium of claim 15, wherein the locational links link a first point representing a specific location in the structure in a first 2D content item to a second point representing a specific location in the structure in a second 2D content item wherein the locations represented by the first and second points are related.

19. The non-transitory computer readable storage medium of claim 15, further comprising instructions that, when executed by the at least one processor, cause the system to place one or more reference indicia on each of two or more of the plurality of 2D content items, wherein the placement of the one or more reference indicia is in association with specific locations of a structure represented by the 2D content item on which each reference indicia is placed and wherein the locational links are formed between reference indicia on different 2D content items.

20. The non-transitory computer readable storage medium of claim 19, further comprising instructions that, when executed by the at least one processor, cause the system to receive an alternate 2D content item, place reference indicia on the alternate 2D content item in association with specific locations of a structure represented by the alternate 2D content item, overlay the alternate 2D content item over an associated 2D content item, and highlight any differences between the alternate 2D content item and the associated 2D content item, wherein the alternate 2D content item is an updated version of the associated 2D content item, and wherein related reference indicia of the alternate 2D content item and the associated 2D content item are aligned during the overlaying of the alternate 2D content item and the associated 2D content item.

\* \* \* \* \*